J. McMILLIN.
Detaching Horses.
No. 102,695. Patented May 3, 1870.
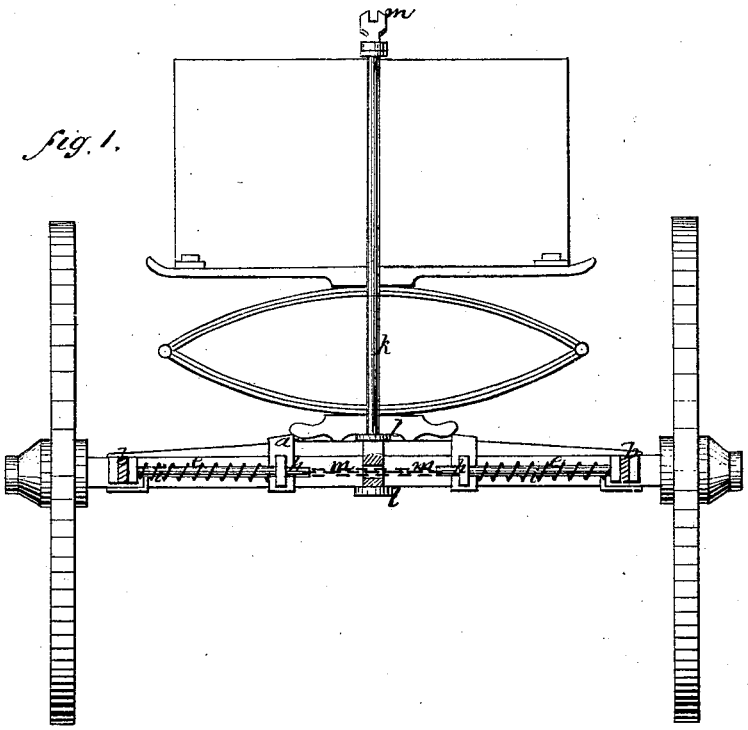
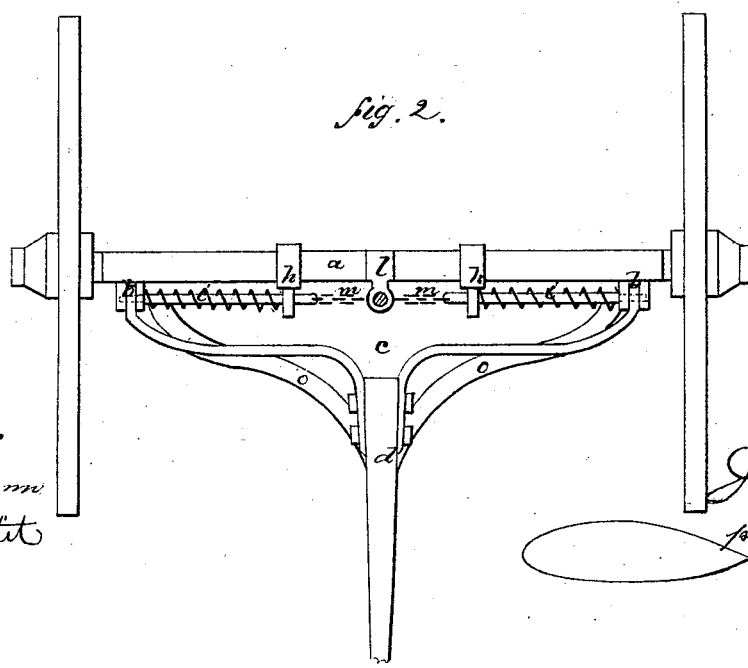
Witnesses:
Inventor:

United States Patent Office.

JAMES McMILLIN, OF RIPLEY, OHIO.

Letters Patent No. 102,695, dated May 3, 1870.

IMPROVED ATTACHMENT OF POLE OR SHAFTS TO WHEELED VEHICLES.

The Schedule referred to in these Letters Patent and making part of the same

---

To all whom it may concern:

Be it known that I, JAMES McMILLIN, of Ripley, in the county of Brown and State of Ohio, have invented a new and useful Improvement in Attaching Pole or Shafts to Wheeled Vehicles; and I do hereby declare that the following is a full, clear, and exact description of the same, reference being had to the accompanying drawings making a part of this specification, in which—

Figure 1 is a front elevation, and

Figure 2 is a plan view.

This invention has for its object to enable the occupant of a carriage to detach the pole or thills when the horses become unmanageable, and thus allow the animals to go on their way, dragging the pole with them, and leave the carriage in safety.

The invention consists in the combination of the pole or thills with spring bolts, by which the same are fastened in lugs on the carriage, and with an apparatus, which may be operated from the carriage, for retracting the spring bolts.

It also consists in the combination of the pole or thills with spring arms, for sustaining the same steadily, and preventing it from striking the horses' heels, while they are dragging it away.

In the drawings—

$a$ is the forward axle.

$b\ b$ are two pairs of lugs near the ends of the axle, in which the ends of the cross-bar $c$, attached to the rear extremity of the pole $d$, are fastened by means of bolts $e$, parallel to the axle, which pass through the lugs and ends of the cross-bar, and also through holders $h\ h$, attached to the front side of the axle, one at each side of the center.

$i\ i$ are spiral springs, placed around the bolts, and between the holders $h$ and lugs $b$.

$k$ is a vertical shaft, sustained in a pair of lugs, $l\ l$, projecting one over the other from the front side of the axle $a$ at its center.

$m\ m$ are chains which fasten the inner ends of the bolts $e$ to the lower part of the shaft $k$.

$n$ is a crank at the upper end of the shaft $k$, projecting inwardly over the dasher of the carriage far enough to be within easy reach of the individual occupying the seat.

When the person riding judges it preferable to dispense with the presence of the horses by reason of bad conduct on their part, all that he need do is to lay hold of the crank $n$, and by it turn the shaft $k$ until the chains $m$ draw the bolts $e$ out of the lugs $b$. This detaches the pole from the carriage, and the latter, in consequence, stops, while the horses, with the pole, go on.

The pole is provided with spring arms $o\ o$, projecting beneath, to each side, which, when the pole is detached, as above described, sustain its rear end, and prevent it from striking the horses' heels.

When thills are used, one thill is held between each pair of lugs.

The crank $n$ is made with a forked end, so as to serve, when separated from the shaft, as a wrench.

The above-described apparatus may also be turned to good account in detaching steady horses from carriages that have become mired or submerged in crossing streams. Furthermore, it admits of an easier and quicker change from pole to thills, or the converse, than the common method of attachment.

By the crank and shaft, the vehicle may be guided when the horses are detached.

Having thus described my invention,

What I claim as new, and desire to secure by Letters Patent, is—

1. The combination of the vertical shaft $k$ and crank $n$ with the bolts $e$, springs $i$, and pole $d$, provided with the cross-bar $c$, all constructed and arranged to operate substantially as described.

2. The combination of the spring arms $o$ with the pole $d$, in the manner and for the purpose specified.

To the above specification of my invention I have set my hand this 5th day of March, 1870.

JAMES McMILLIN.

Witnesses:
    F. F. SHAW,
    ISAAC MOORE.